Jan. 12, 1943.  C. SAURER  2,308,458
MOTOR MOUNTING
Filed Dec. 17, 1940
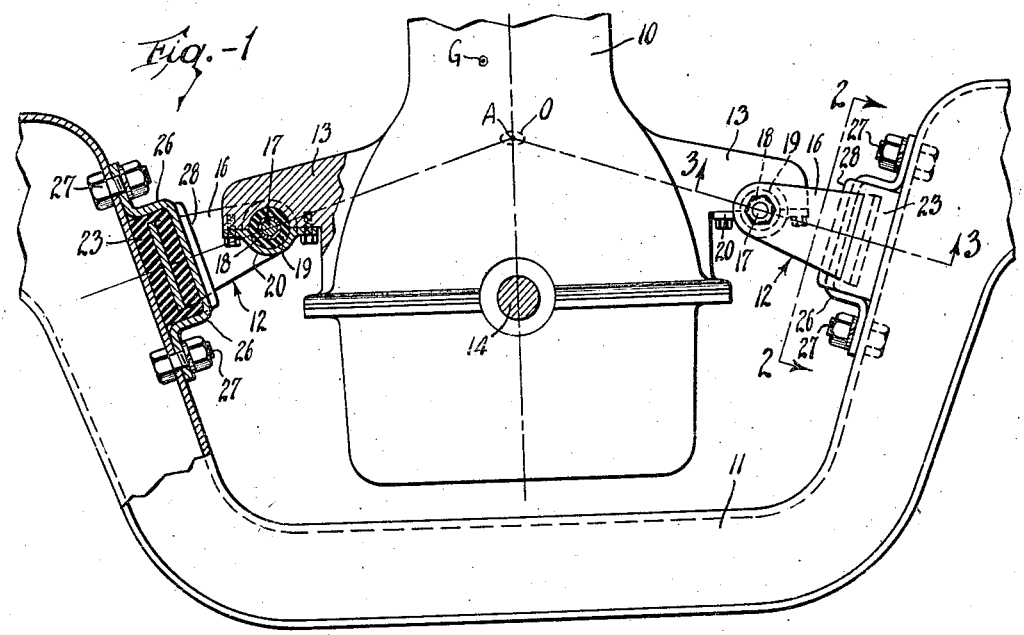
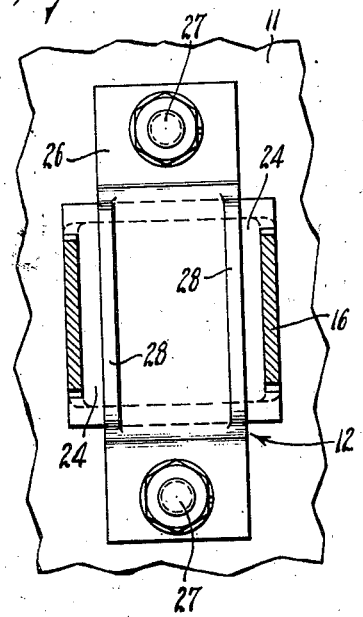
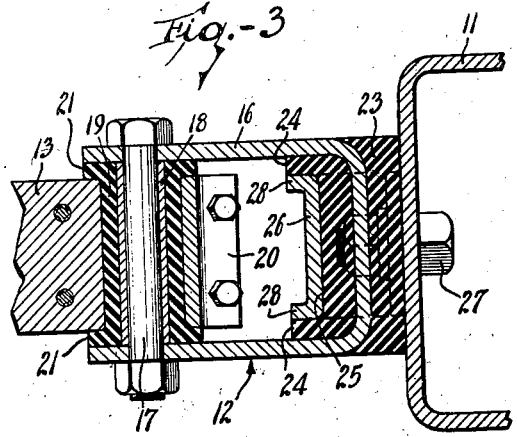
INVENTOR
CURT SAURER
ATTORNEYS Patented Jan. 12, 1943

2,308,458

UNITED STATES PATENT OFFICE 2,308,458

MOTOR MOUNTING

Curt Saurer, Akron, Ohio

Application December 17, 1940, Serial No. 370,472

8 Claims. (Cl. 248—7)

This invention relates to mountings for the support of the motors of motor driven vehicles, and more especially it relates to motor mountings of the character mentioned that comprise resilient material as a means for damping motor vibration and impeding the translation thereof to the frame and body of the vehicle.

A vehicle motor of the internal combustion type operating in a moving vehicle sets up numerous vibrations, such as fore and aft vibration that is parallel to the axis of the crank shaft of the motor, torque and torque reaction, vertical and horizontal vibrations due in part to bound and rebound of the vehicle, and gyratory vibration induced by the rotation of the crank shaft of the motor. The said gyratory movement has an axis that is substantially parallel to the crank shaft, and is located a few inches above the latter, between the crank shaft and the center of gravity of the motor.

It will be apparent that every part of the vehicle motor is subject to gyratory movement, and the extent or magnitude of such movement varies in different regions of the motor due especially to pendulum action of the motor. Accordingly the term "axis of gyration" as used herein is intended to designate the imaginary line or axis about which the orbit of gyration is of smallest extent, that is, the "axis of gyration" is the axis of minimum gyration. The location of said axis is the result of several factors, which include the height of the motor, the location of the center of its mass, the gyratory action of the crank shaft, and the location of fly wheel or wheels, but its location generally is from 2 to 3 inches above the crank shaft, depending upon the particular characteristics of the motor. Said axis of gyration is substantially parallel to centerline of the crank shaft, and will not deviate more than three degrees therefrom as the result of fly wheel, gear case, and other heavy members that may be located at one end of the motor. The term "natural axis of gyration" is used herein to designate the axis of minimum gyration when the vehicle motor is considered as a floating body without support.

Numerous resilient motor mountings have been proposed for damping motor vibration, among which may be mentioned those that support the motor on an axis that extends through its center of gravity, or through an arbitrarily established axis. Such supports, however, are not entirely successful in accomplishing the results desired, experience having shown that motor mountings positioned in determinate relation to the axis of gyratory movement set up by the crank shaft of the motor to be more effective in preventing the translation of gyratory vibration to the frame of the vehicle.

The chief objects of the invention are to improve the riding qualities of motor vehicles and to contribute to the comfort of the passengers thereof; and to improve the mechanical qualities of motor vehicles by reducing the amount of engine vibration transmitted to the frames and bodies thereof. More specifically the invention aims to provide motor supports so constructed and arranged as to enable the motor to vibrate in an orbit about the aforementioned center of minimum gyration, yet also to resist vibration in other directions. Other objects will be manifest as the description proceeds.

Of the accompanying drawing:

Figure 1 is a front elevation of a vehicle motor and its supporting frame, and a pair of improved motor mountings operatively interposed between said motor and frame, one of said motor mountings being shown in vertical section;

Figure 2 is a section on the line 2—2 of Fig. 1; and

Figure 3 is a section on the line 3—3 of Fig. 1.

Referring first to Fig. 1 of the drawing, there is shown a vehicle motor 10 of the conventional type, a cross member 11 of the vehicle frame for supporting the front end of the motor, and a pair of improved resilient motor mountings, each designated as a whole by the numeral 12, operatively interposed between the motor 10 and frame member 11, said supports being attached directly to the frame member, and being secured to respective bracket arms 13 that project laterally from the motor 10. Indicated on said motor is its center of gravity G, the same being substantially in the position it assumes when the motor is idling, that is, operating at a speed of 8 miles an hour or less. Also indicated on the motor 10 is the axis A about which the motor gyrates when operating at driving speeds of from 20 to 60 miles an hour or more, and shown by the broken line O about the axis A is the orbit of gyration of the motor under impetus of the rotating crank shaft 14, said orbit being of elliptical shape. As previously stated, the resilient mountings 12 are attached to the cross member 11 upon flat surfaces thereof, said surfaces being so angularly disposed that perpendiculars thereto extending through the centerlines of the mountings 12 intersect each other at the natural axis of gyration A.

As is best shown in Figs. 2 and 3, each of the resilient mountings 12 comprises a stirrup-like clevis 16, the ends of which are apertured to receive a bolt 17 by means of which the clevis is connected to a bracket arm 13. Positioned between the ends of the clevis is a bushing comprising a tubular metal core 18 and a generally cylindrical body of resilient rubber composition 19 mounted on the exterior surface thereof, said bolt 17 being anchored to the metal core 18 to prevent relative movement therebetween. The rubber body 19 is somewhat reduced in diameter in its medial region to receive the recessed bottom face of the bracket arm 13, and a semi-circular clamping member 20. The arrangement is such that the motor 10 may be lowered vertically onto the rubber bushings during the assembly of the vehicle, the clamps 20 being adapted to confine the bushings tightly in the ends of the bracket arms so as to prevent relative movement between the latter and the bushings. The rubber bushings 19 are somewhat longer than the width of the bracket arms 13 so that there is a flange of rubber 21 between the bracket arms and the sides of the clevis, the function of which flanges presently will be explained.

The medial region of the clevis 16 is enclosed in a body of resilient rubber composition 23 that is vulcanized thereto and covers the opposite faces and margins of said medial portion, as is best shown in Fig. 1, and is flush with the outer faces of the sides of the clevis as is best shown in Fig. 3. The rubber body 23 is substantially of uniform thickness on opposite faces of the clevis, and on the side thereof that is between the sides or arms of the clevis the rubber is extended somewhat at 24, 24 onto the confronting faces of the clevis, the arrangement providing a groove or recess 25 in the rubber body extending transversely thereof between the sides or arms of the clevis. Received in the groove 25 is cleat 26 that secures the clevis to the cross member 11 of the vehicle frame, said cleat having a central bridgelike structure that engages the rubber body 23 in the groove 25 and the opposite end faces of said body, the end portions of the cleat bearing against the cross member 11 and being apertured to receive respective bolts 27 by which the cleat is secured to said cross member. Preferably the inside dimensions of the bridge portion of the cleat are somewhat smaller than the dimensions of the rubber body 23 engaged thereby so that the latter is placed under appreciable compressive stress. The groove 25 is somewhat deeper than the thickness of cleat structure received therein, and the medial region of the cleat has its lateral margins formed integrally with upstanding flanges 28, 28 that abut the flanges 24 of the rubber body 23.

As is clearly shown in Fig. 1, the axes of the bolts 17 are parallel to each other and to the axis of gyration A of the motor 10. Furthermore, radii extending from said axis A and passing thronugh the axes of respective bolts 17 are perpendicular to the surfaces of the cross member 11 upon which the resilient mountings are secured, at the medial region of said mountings, said radii diverging downwardly from said axis of gyration. Thus it will be seen that gyratory movement of the motor 10 in the orbit of gyration 0 is yieldingly opposed by the rubber bodies 23 of the motor mountings, which opposition is the result of the resistance of said rubber bodies to compressive stress. Those portions of the rubber bodies that are disposed between the clevises 16 and the members 11 sustain the load when the motor is in the lower part of its orbit 0, and those portions of the rubber bodies disposed between the cleats 26 and the clevises 16 sustain the load when the motor is in the upper part of its orbit. In like manner the rubber portions that are disposed between the margins of the clevises and the bridge portions of the cleats yieldingly oppose gyratory movement of the motor. Since the various portions of the rubber bodies are symmetrically and uniformly disposed about the clevises, the mountings offer uniform resistance to gyratory movement of the motor in all regions of the latter's orbit and a balanced condition obtains, with the result that but little vibration is transmitted to the vehicle frame as the result of the gyratory movement of the motor. As the motor moves in its orbit of gyration, there is at least a modicum of relative angular movement between the bolts 17 and the bracket arms 13 with the result that the rubber bushings 19 are subjected to torsional stress, to which stress they offer uniform resistance at all times. Thus the bushings 19 supplement the rubber bodies 23 in cushioning the gyratory movement of the motor.

Operation of the motor 10 also induces fore and aft vibration thereof, which fore and aft vibration is yieldingly opposed by the resilient mountings described, but to a greater degree than their opposition to gyratory movement of the motor. Thus fore and aft vibration of the motor is opposed by the resistance to compression of the flange portions 21 of the bushings 19, and the flange portions 24 of the rubber bodies 23. Since said flange portions are of relatively small mass as compared to the mass of the respective bushings 19 and bodies 23, it will be seen that fore and aft vibration of the motor is more strongly resisted. Vertical vibration and horizontal vibration of the motor effects a rocking of the clevises 16, and torsional strains upon the bushings 19, with the result that the mountings yieldingly resist such vibration in substantially the same manner that they resist gyratory vibration of the motor.

The invention improves the riding qualities of motor vehicles by reducing the amount of motor vibration transmitted to the frames and bodies thereof, and achieves the other advantages set out in the foregoing statement of objects.

Modification may be resorted to without departing from the spirit of the invention or the scope thereof as defined by the appended claims.

What is claimed is:

1. A motor mounting between a motor having gyratory movement about an axis and a support for said motor, said mounting comprising a pair of inclined devices that comprise resilient material and which converge toward the natural axis of minimum gyration of the motor, said devices being so constructed and arranged as yieldingly to resist gyratory movement of the motor uniformly in all regions of its orbit of gyration, and less yieldingly to resist fore and aft vibration of the motor, by reason of the resistance to compression of said yielding material.

2. A motor mounting between a motor having gyratory movement about an axis and a support for said motor, said mounting comprising a pair of inclined resilient devices converging toward the natural axis of minimum gyration of the motor, said devices each having one end thereof pivotally connected to the motor on axes that are parallel to said axis of gyration.

3. A motor mounting between a motor having gyratory movement about an axis and a support for said motor, said mounting comprising a pair of inclined devices converging toward the natural axis of minimum gyration of the motor, each of said devices comprising a U-shaped member pivotally connected at its open end to the motor, a cleat spanning the closed end of the member to secure the same to said motor support, and yielding means operatively interposed between the U-shaped member and said cleat and between said U-shaped member and said motor support.

4. A motor mounting as defined in claim 3 wherein the surface of the yielding means in contact with the motor support is perpendicular to a radial line extending through the natural axis of minimum gyration of the motor and through the axis of the pivotal connection between the motor and mounting.

5. A motor mounting of the character described comprising a U-shaped member pivotally connected at its open end to a motor, a body of resilient rubber enclosing both faces of the closed end of said member and the lateral margins thereof, and a cleat securing said mounting to a motor support, said cleat extending transversely across the closed end of the member in engagement with the rubber body between the respective arms of the U-shaped member and over the lateral margins of the member.

6. A motor mounting as defined in claim 5 in which the rubber body is formed with a recess extending transversely of the U-shaped member, and the cleat is received in said recess.

7. A motor support as defined in claim 5 wherein the cleat has upstanding flanges upon opposite marigns thereof, and the rubber body is formed integrally with flanges of rubber disposed between the respective cleat flanges and the adjacent arms of the U-shaped member.

8. A motor mounting between a motor having a gyratory movement about an axis and a support for said motor, said mounting comprising a pair of inclined devices converging toward the natural axis of minimum gyration of the motor, each of said devices comprising a clevis having the open ends thereof pivotally connected to the motor on an axis parallel to the said axis of gyration thereof, said pivotal connection comprising a rubber bushing constructed and arranged to oppose relative angular movement of the connected parts arising from gyratory movement of the motor, said bushings including integral flanges that oppose relative axial movement of the connected parts arising from fore and aft movement of the motor, a body of rubber enclosing opposite faces and lateral margins of the closed end of said clevis, and a cleat extending transversely across the closed end of the clevis in engagement with the rubber body to secure the clevis to the motor support, said rubber body comprising integral flanges extending onto the confronting faces of the arms of the clevis, and said cleat comprising upstanding marginal flanges in engagement with the flanges on the rubber body.

CURT SAURER.